UNITED STATES PATENT OFFICE.

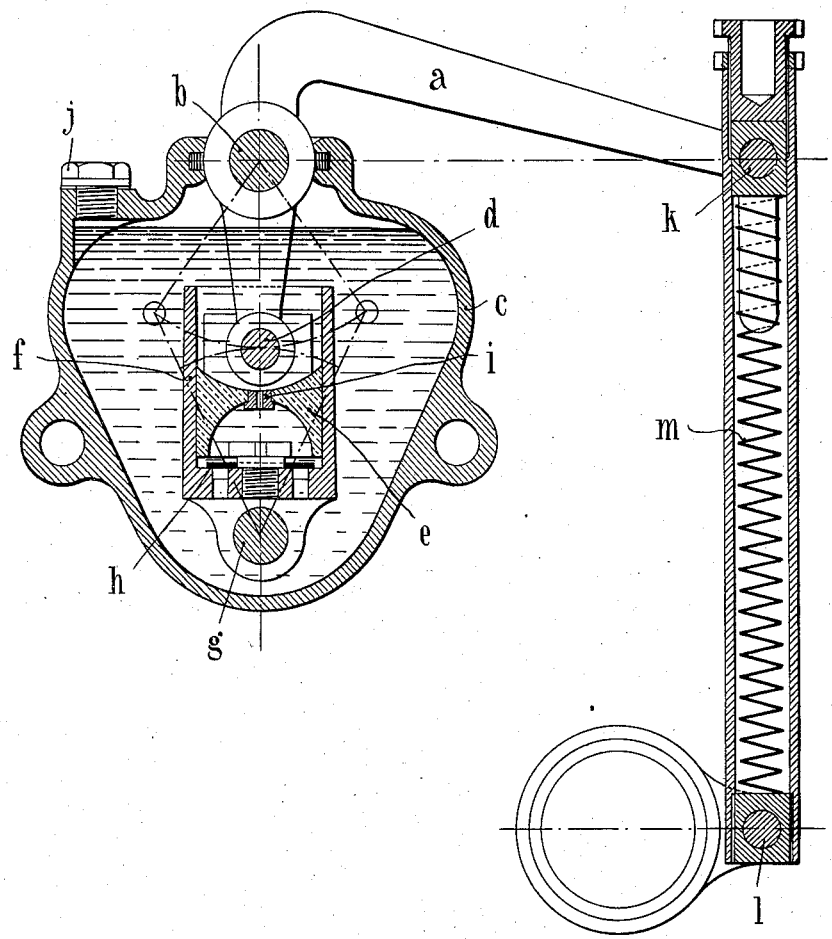

LOUIS CHANUDET AND GEORGES PROSPER RIBIS, OF NEUILLY-SUR-SEINE, FRANCE.

SHOCK-ABSORBER.

997,370.  Specification of Letters Patent.  Patented July 11, 1911.

Application filed March 25, 1910. Serial No. 551,581.

*To all whom it may concern:*

Be it known that we, LOUIS CHANUDET and GEORGES PROSPER RIBIS, citizens of the Republic of France, and residents of 11$^{bis}$ Avenue de la Révolte, Neuilly-sur-Seine, France, have invented a Shock-Absorber, of which the following is a specification.

The present invention has for its object to provide a shock absorber wherein the spring remains absolutely free to deviate from its position of equilibrium in one direction or the other, the braking effect taking place only during its return to a position of equilibrium with an energy proportional to the degree of flexion, small oscillations remaining practically unaffected by the braking effect.

Other objects and advantages of the invention will be apparent from the following description when taken in connection with the accompanying drawings.

The invention consists in the novel construction, arrangement and combination of parts as hereinafter fully described, illustrated in the drawing and pointed out in the appended claims.

In the drawing we show the invention by a sectional elevation.

The bent lever $a$, pivoted at $b$, to the casing $c$, is pivotally connected by stud $d$, to a piston $e$, movable in the oscillating cylinder $f$, pivoted at $g$, in the casing. A valve $h$, opening into the cylinder puts the latter into communication through its base with the casing $c$. On the other hand, a bushing $i$, with a small opening of predetermined size gives permanent communication between the cylinder and the casing. The casing is filled with an appropriate liquid, as oil; this can be done by removing the plug $j$. The lever $a$, is connected to the axle by a tubular connection $k$, $l$, and rendered yielding in one direction only by spiral spring $m$. The position shown in the drawing, wherein the three pivotal points $b$, $d$, $g$, are in line or substantially so, corresponds to the normal load of the springs, and it will be seen that the movements of the axle in either direction from this position produce the symmetrical displacement of the oscillating cylinder and correspond to the dotted line position seen in the drawing. It therefore follows that if the axle moves in any direction from its position of normal load, the piston works easily, the liquid flowing freely into the cylinder through valve $h$, while the liquid drawn in cannot flow out or return to the casing except by the small opening $i$, which thus offers a great resistance to the movement of the piston $e$. The limitation of the overloading of the tires naturally results from the construction of the yielding connection $k$, $l$.

The connection of the lever $a$, with the piston $e$, could, obviously, be replaced by a cam gearing, without in any way departing from the principle of the invention.

What we claim is:

1. A shock absorber for vehicles comprising a casing adapted to contain a liquid, a cylinder arranged within said casing and pivotally connected therewith, a piston movably arranged in the cylinder, a lever pivotally connected with the casing and also with the piston, the points of articulation of the lever with the casing and piston and the pivotal point of the cylinder being substantially in line with each other under normal load of the vehicle, and means for placing the interior of the cylinder below the piston in permanent communication and also in controlled communication with the interior of the casing.

2. A shock absorber for vehicles comprising a casing, adapted to contain a liquid, a cylinder arranged within said casing and pivotally connected therewith, a piston movably arranged in the cylinder, a lever pivotally connected with the casing and also with the piston, the points of articulation of the lever with the casing and piston and the pivotal point of the cylinder being substantially in line with each other under normal load of the vehicle, said piston having a small opening to provide permanent communication between the interior of the cylinder and the interior of the casing, and an upwardly-opening valve carried by the cylinder and providing separate but controlled communication between the interior of the cylinder and the interior of the casing.

In testimony whereof we affix our signatures in presence of two witnesses.

LOUIS CHANUDET.
GEORGES PROSPER RIBIS.

Witnesses:
DEAN B. MASON,
EDMOND LAEVUTNUIER.